United States Patent
Watkins et al.

(10) Patent No.: US 9,250,945 B2
(45) Date of Patent: Feb. 2, 2016

(54) DETECTING A REPEATING EXECUTION TIME SEQUENCE IN A VIRTUAL MACHINE

(75) Inventors: Douglas A. Watkins, Bellevue, WA (US); Gregory C. Johnson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 818 days.

(21) Appl. No.: 13/430,689

(22) Filed: Mar. 27, 2012

(65) Prior Publication Data

US 2013/0263114 A1 Oct. 3, 2013

(51) Int. Cl.
*G06F 9/455* (2006.01)
*G06F 9/46* (2006.01)

(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 7,844,954 B2 | 11/2010 | Venkitachalam et al. | |
| 8,706,833 B1 * | 4/2014 | Bergant et al. | 709/214 |
| 2006/0101091 A1 * | 5/2006 | Carbajales et al. | 707/202 |
| 2009/0144510 A1 * | 6/2009 | Wibling et al. | 711/147 |
| 2009/0144570 A1 * | 6/2009 | Chen et al. | 713/320 |
| 2009/0222815 A1 | 9/2009 | Dake | |
| 2009/0248611 A1 | 10/2009 | Xu et al. | |
| 2009/0293058 A1 * | 11/2009 | Ahn et al. | 718/1 |
| 2009/0320010 A1 | 12/2009 | Chow et al. | |
| 2010/0251031 A1 | 9/2010 | Nieh et al. | |
| 2011/0246990 A1 | 10/2011 | Shimogawa | |
| 2012/0144391 A1 * | 6/2012 | Ueda | 718/1 |
| 2013/0339953 A1 * | 12/2013 | Wibling et al. | 718/1 |

OTHER PUBLICATIONS

Dunlap, et al., "Execution Replay for Multiprocessor Virtual Machines", Retrieved at <<http://www.cs.columbia.edu/~junfeng/10fa-e6998/papers/smp-revirt.pdf>> VEE '08 Proceedings of the fourth ACM SIGPLAN/SIGOPS international conference on Virtual execution environments, 2008, pp. 121-130.

* cited by examiner

*Primary Examiner* — Tammy Lee
(74) *Attorney, Agent, or Firm* — Johm Jardine; Judy Yee; Micky Minhas

(57) ABSTRACT

A generation identifier is provided having a value established upon generating a new virtual machine configuration context or a snapshot of a virtual machine configuration context. The generation identifier is configured to be sampled in order to indicate whether the sampled generation is a latest generation. To use the generation identifier, a service or application persists the generation identifier upon resuming or initiating operation. During normal operation or replay, the persisted generation identifier is compared to the generation identifier sampled from a location associated with the virtual machine configuration context on which the service or application is being run before performing a requested process or committing to a transaction. When the sampled generation identifier is different than the persisted generation identifier, the service or application knows that it is running a time-shifted operation such as from a snapshot replay.

13 Claims, 5 Drawing Sheets

DETECTING A REPEATING EXECUTION TIME SEQUENCE IN A VIRTUAL MACHINE

BACKGROUND

Many database applications utilize virtual machine environments to run tasks and provide redundancy and security in operation. When a workload in a virtual machine environment undergoes a transparent time-shifting operation, such as a replay during an application of a snapshot, importation of a virtual machine configuration, restoration of a virtual machine configuration from a back-up, or a failing over to a replication target, it is possible for workload dataset corruption to occur.

For example, replays of previously committed transactions and invalid state or trust relationships between synchronization peers (e.g., participants of a system in which data is synchronized in a peer-to-peer manner) may result in workload dataset corruption and have the potential to pollute a distributed or replicated dataset. In addition, rolling back or replaying a previous machine state can re-expose or reactivate security vulnerabilities in a virtual machine environment, re-enable previously disabled accounts or passwords, use previously retired encryption keys, as well as create the possibility of rendering predictable a randomly generated number such as used for encryption.

BRIEF SUMMARY

Systems and structures are disclosed herein that provide an accessible identifier configured to 1) remain constant when the execution timeline of a virtual machine is contiguous and contains non-repeating time intervals, and 2) change when the execution timeline contains a discontiguous, and potentially repeated, time interval.

Techniques using some embodiments of the subject identifier to determine that a future time slice has been executed in a current configuration context are disclosed herein. This determination by internal or external services or applications can be used to inhibit dataset corruption and/or improve security.

In accordance with certain embodiments of the invention, the accessible identifier is observable by services or applications running inside a virtual machine. These services or applications can access the identifier and determine whether the current execution sequence has been time-shifted.

According to one aspect of the invention, a workload running in a virtual machine is able to detect a replay of a previous time sequence and protect its dataset against the effects of time-shifting operations.

According to another aspect of the invention, the identifier can be accessed and used as a random number seed for use in encryption.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A virtual machine is a "virtualization" of a physical computer system, and may be backed by underlying physical resources. Virtual machines are often used to enable multiple operating systems (and corresponding applications) to run on a single physical machine by sharing the resources of the single physical machine across multiple environments while operating independently. Virtual machines are constructs providing an isolated container that can execute software and run applications by emulating a physical machine while not being restricted to only the resources available to a single physical machine.

Figure 1:
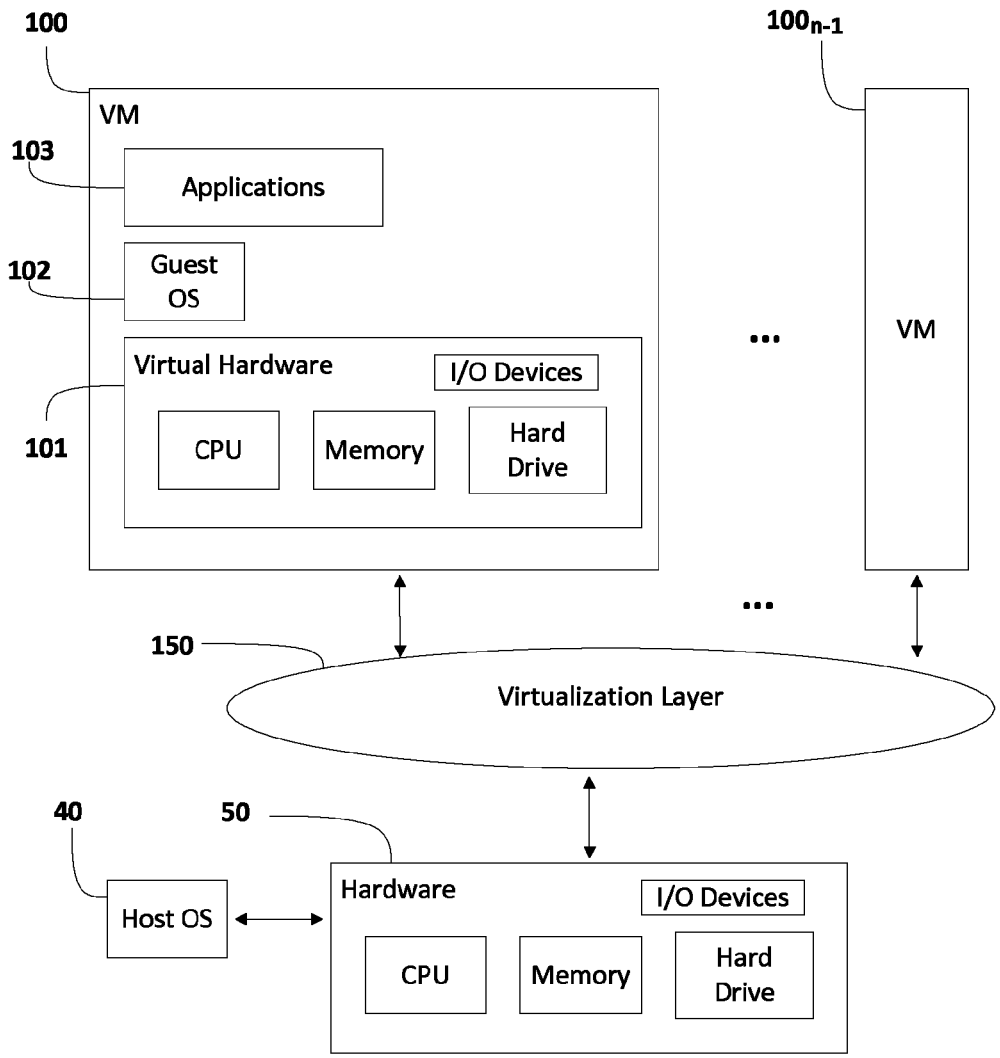
FIG. 1 illustrates a virtual machine environment in accordance with an embodiment of the invention.

FIG. 1 illustrates a virtual machine environment in accordance with an embodiment of the invention. As shown in FIG. 1, a virtual machine (VM) 100 can include virtualized hardware 101, an operating system 102 (also referred to as a guest operating system), and applications 103. A plurality of virtual machines ($100, \ldots, 100_{n-1}$) can be hosted on a single platform, such as computer system 50, which can have hardware including one or more computer processing units (CPUs), memory, mass storage (e.g., hard drive), and I/O devices (e.g., network interface, user input devices). The physical hardware of the platform may be any suitable computer hardware according to any suitable computer architectures such as a Symmetric Multi-Processing (SMP) architecture or a Non-Uniform Memory Access (NUMA) architecture. The one or more CPUs may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the physical hardware of the system in place of or in addition to a general purpose CPU.

The virtual machines hosted on the single platform may run different operating systems and include different applications and virtualized hardware. The particular number and design of the virtual machines can be selected for suitability to their intended purposes.

The virtualized hardware 101 may include all or some of the hardware components of an underlying physical machine 50. For example, one or more processors, memory, mass storage, and I/O devices may be virtualized as part of the virtual machine 100. A virtualization layer 150 is generally provided as an interface between the virtual machine(s) and the underlying platform. The virtualization layer 150 can be a hypervisor including a kernel and virtual machine monitor. The virtualization layer 150 can be a part of or run alongside of the operating system (Host OS 40) of the underlying platform (e.g., underlying physical machine 50). In one embodiment, the virtualization layer can be provided via the hypervisor-based virtualization technology Hyper-V®, a registered trademark of Microsoft Corporation.

The virtualization layer 150 is responsible for creating the execution containers (also referred to as "partitions") instantiating the virtual machines 100. The virtualization layer 150 creates, for each partition, an isolated address space and a collection of virtualized devices (e.g., the virtualized hardware 101) that are very similar to those found in physical systems (e.g., physical machine 50). For example, on physical machines (e.g., physical machine 50), a BIOS (basic input-output system) image is mapped (and many times copied from firmware) into a physical address. Virtual machine environments also map a BIOS image into the physical address space of the execution container (e.g., the partition) in the course of preparing the partition for execution. The mapping enables the contents of an image or data file (e.g., the BIOS image) to be linked directly to the address space for the partition.

When the virtualization layer 150 prepares a partition for execution, the virtualization layer 150 applies the properties of a configuration context in order to create the environment for hosting a workload.

A "configuration context" refers to the set of properties that define the execution environment of a virtual machine, including any storage resources (e.g., memory, mass storage) associated with the virtual machine, and can be set for each executable version of a virtual machine.

A "workload" refers to a task, a function, and/or a distinct unit of work that is processed (e.g., executed) by a processing device. Workloads can be managed by services. A "service" refers to a logical abstraction (e.g., an executable) that performs specific functions without requiring user intervention. A "service" can also be referred to as a background process or daemon.

Figure 2:
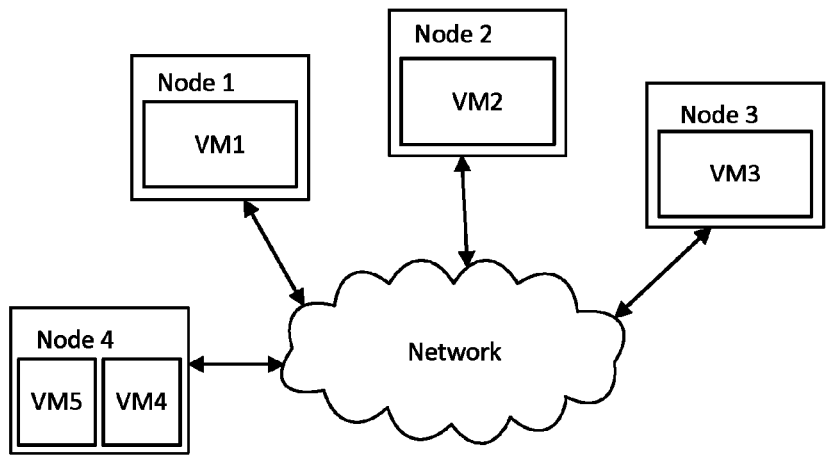
FIG. 2 illustrates a networked virtual machine environment in accordance with an embodiment of the invention.

FIG. 2 illustrates a networked virtual machine environment. In accordance with certain embodiments of the invention, the network may be any suitable communications network including, but not limited to, a cellular (e.g., wireless phone) network, the Internet, a local area network (LAN), a wide area network (WAN), a WiFi network, or a combination thereof. Such networks are widely used to connect various types of network elements, such as routers, servers, and gateways. It should also be understood that the invention can be practiced in a multi-network environment having various connected public and/or private networks. As will be appreciated by those skilled in the art, communication networks can take several different forms and can use several different communication protocols.

Each node in the networked virtual machine environment may be a personal computer, a server, or other computing device and may host at least one virtual machine. Four nodes Node1, Node2, Node3, and Node4 are shown in FIG. 2. Node1 provides a platform for virtual machine VM1, Node2 provides a platform for virtual machine VM2, Node3 provides a platform for virtual machine VM3, and Node4 provides a platform for virtual machines VM4 and VM5. The particular configuration of the virtual network, the configuration for each virtual machine, as well as the configuration of how each virtual machine interacts with its virtualization host/node (including but not limited to shutdown, time synchronization, data exchange, and backup) can be specified in accordance with any suitable technique. As one example, Hyper-V® may be used to create, configure, and manage a networked virtual machine environment.

Figure 3:
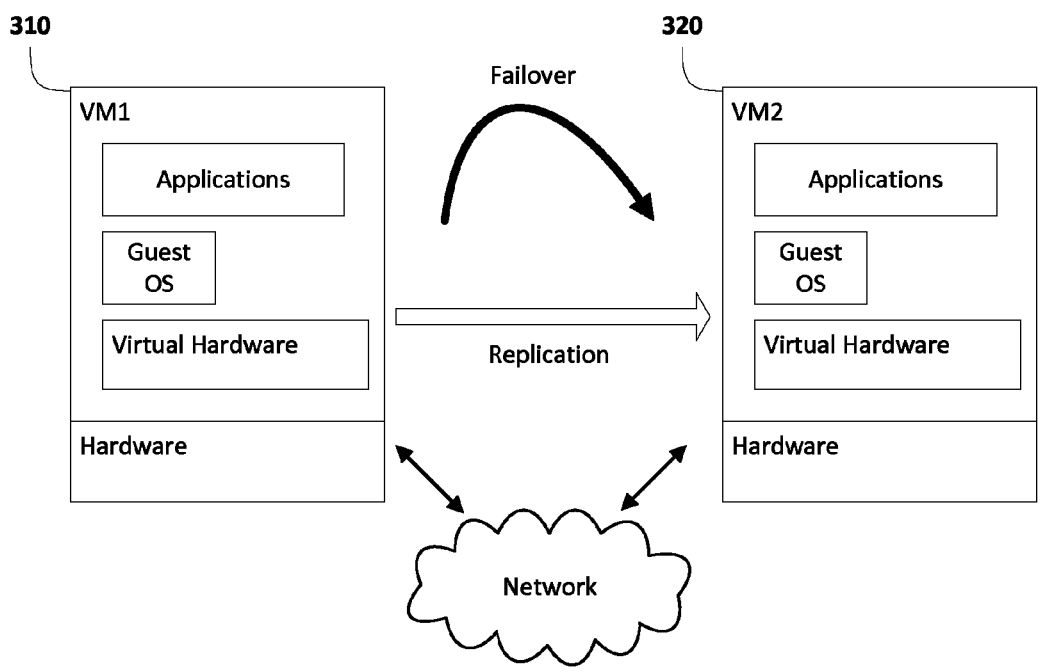
FIG. 3 illustrates a failover operation that may occur in a networked virtual machine environment.

The virtual machines can communicate across the network to perform a variety of processes including passing data between machines to be stored or acted upon. For example, VM2 can be a secondary virtual machine to, and synchronized with, VM1, which enables VM2 to function as a failover target as shown in FIG. 3. For example, VM1 and VM2 can run the same processes in a manner that VM2 creates redundancy for the processes performed using VM1. However, the output of VM2 may be suppressed so that only VM1 is writing to a disk or transmitting packets over the network. In some cases, VM1 communicates with VM2 to provide updates regarding nondeterministic events. Then, because VM2 can function as a failover target, if VM1 or the platform on which VM1 is provided has a failure or defect, then VM2 is available to take over and continue processes without undue interruption. For example, if the physical machine on which VM1 is running undergoes a hardware failure, then VM2 can continue performing processes with minimal interruption to the workload. The synchronization and monitoring to enable failover may be performed by technologies such as VMware® vLockstep technology, a registered trademark of VMware Inc., and Microsoft® Clustering Services or Windows Server® Failover Clustering (Microsoft® and Windows Server® are registered trademarks of Microsoft Corporation).

A virtual machine provides a software container (e.g., the "execution container" or "partition") of bundled resources, operating system, and applications. Accordingly, portability and recoverability of applications and workloads are facilitated by using a virtual machine. For example, a virtual machine enables the portability of using a variety of platforms, operating systems, and formats. In addition, backup and recovery of data can be accomplished for applications running on a virtual machine. In addition to recoverability, a replay of a workload or process can be facilitated by using a virtual machine. For example, one method for recovery and replay involves snapshots.

A "snapshot" refers to a capture of the current state and data of a running, paused, or stopped virtual machine. A snapshot can be performed as part of an automated process for periodic capture of the current state and data of a virtual machine or arbitrarily upon a user's directive. A snapshot enables reversion to a previous virtual machine configuration. When a snapshot is created, the virtual machine's state, data, and configuration at a specific point in time is stored as a file on a storage device. The stored file can be accessed and used for re-running and/or debugging a previous virtual machine configuration and its transactions. This re-running of a previous state and data of a virtual machine can result in "time-shifting."

Time-shifting is viewable by an observer and occurs where a virtual machine state is recorded and played back at a future 'absolute' time (e.g., the time that progresses independently of the virtual machine), resulting in a past 'machine' time (e.g., the time relative to the operation of the workload) being viewed or accessed at a present 'absolute' time and the ability to move forward and back in 'machine' time in a non-contiguous manner using the recorded states. While a snapshot is being created, there is latency between the time the snapshot is started and the time the snapshot is finished during which a continuous exchange of configuration data is occurring. Therefore, snapshots are often captured outside of production and during testing phases.

An "execution timeline" of a workload refers to the time periods (or cycles) to complete a task or perform a particular process. Certain tasks may require a particular amount of time to run. This amount of time can be referred to as the "run time" of the task. An execution timeline includes the order of when tasks are executed along with the run time for each task. For example, the execution timeline can include the start time and end time of each sequential and parallel task of a workload. A time period of the execution timeline in which one or more tasks have started and completed can be referred to as a "segment" of the execution timeline. A segment can be subdivided into time slices.

Time-shifting operations that can take place in virtual machine environments create challenges for workloads that suffer adverse effects if their execution timeline is not contiguous.

The execution timeline of workloads running on physical machines can be discontinuous. For example, the physical machine can be stopped for an arbitrary amount of time before resuming execution. Gaps in time can be introduced into the execution sequence at arbitrary points. However, the timeline remains contiguous (unless some defect or failure occurs in the physical machine). Therefore, the execution sequence, once resumed, is expected to be the most recent extension of the workload timeline for that particular physical machine configuration context.

Virtual machine environments create the potential for workloads to repeat the execution of a previously executed time interval. Virtual machines can be suspended and resumed at arbitrary execution points, which creates the possibility of the execution sequence to be both discontinuous and discontiguous. The resumed execution sequence can represent a time interval that the workload has already experienced in that particular virtual machine configuration context.

Because an execution timeline of a workload in a virtual machine environment can be discontinuous and discontiguous, a contiguous, non-repeating collection of segments of the execution timeline of a virtual machine configuration context can be referred to as a "generation." A new generation may be a result of the creation of a new configuration context or snapshot.

When a workload in a virtual machine undergoes a transparent time-shifting operation it is possible for workload dataset corruption to occur. As an illustration of dataset corruption, if a system is provided having a networked bank and virtualized automated teller machine (ATM), then a replay of a $100 deposit to the ATM corrupts the account information at the networked bank (e.g., the dataset) if the networked bank increases the amount indicated as being in an account by the $100 a second time (a $200 total increase).

A process or action is said to be "transparent" when it is invisible or undetectable to a user or device. In the networked bank example, the replay of the ATM deposit can be considered to have been transparent because the virtualized ATM and/or the networked bank did not detect that a replay was occurring, resulting in the account at the networked bank reflecting two deposits instead of one. As another example, a failover process can be transparent to a user when the failover occurs without a user noticing that the virtual machine running a workload has changed due to hardware failure of a host of the virtual machine originally running the workload. Thus, in the case of a transparent failover, the user sees no interruption in service or loss of data. A virtual machine may undergo a number of transparent operations; some of the operations being transparent to a user and other operations being transparent to certain processes running on the virtual machine. Of course, there may be operations transparent to both a user and processes running on the virtual machine.

Some transparent operations involve time-shifting operations. In the case of time-shifting operations, processes running on the virtual machine would not be aware that a time-shifting operation occurred. Common virtual machine operations that can create time-shifted conditions include, but are not limited to, applying a snapshot, importing a virtual machine configuration, restoring a virtual machine configuration from a backup, and failing over to a replication target. Dataset corruption may occur during replays of previously committed transactions and invalid state or trust relationships between synchronization peers (or partners participating in a system in which data is synchronized in a client-server manner).

"Replication" refers to the copying and distributing of data from a source to a target and is generally used in situations where an identical copy of the complete dataset of the source is maintained at the target. "Synchronization" also refers to the copying of data, but is generally used to reconcile changes between a sub-set of data and a more persistent full-set of data, as well as to reconcile changes from workload operations across a network.

As yet another example of transparent time-shifting, if a snapshot is applied to replay a segment of an execution timeline of a workload, an observer outside the virtual machine and/or the workload inside the virtual machine may not be aware that the segment being executed is a replay of a previously executed segment. To the observer outside the virtual machine and/or the workload inside the virtual machine, the segment being executed appears as a present time segment and the segments or time slices of the execution time line being executed at a time beginning from the end of the previously executed segment appear as future time segments or slices. These future time segments or slices may have also been executed before the replay begins.

Since observers outside of a virtual machine and workloads inside of a virtual machine can benefit from understanding whether a future time slice has been executed in a virtual machine's current configuration context, certain embodiments of the invention provide an identifier that is configured to enable a determination as to whether a process is being executed in a latest generation. In accordance with embodiments of the invention, the identifier 1) remains constant when the execution timeline of a virtual machine is contiguous and contains non-repeating time intervals, and 2) changes when the execution timeline contains a discontiguous, and potentially repeated, time interval.

In one embodiment of the invention, a virtualization platform (e.g., a virtual machine manager such as provided by Hyper-V®) assigns each generation an identifier that becomes one of the properties in a virtual machine's configuration context. To enable efficient identification of different generations, the identifier is configured to be statistically unique (e.g., the likelihood that a repeating value occurs is negligible) across all instances of all virtual machine configuration contexts and is permanently bound to the context for which the identifier was created, remaining invariant for the lifetime of that context. This identifier can be referred to as a "generation identifier." The virtualization platform makes the generation identifier property (e.g., identifier value) of the configuration context accessible to services running within the virtual machine's execution environment.

In accordance with various embodiments of the invention, the ability of a virtualization layer to project properties of the configuration context, including the BIOS image, into the execution container's address space prior to the start of execution is leveraged in order to project the generation identifier into the address space of an execution container prior to the start of execution of the virtual machine.

In one embodiment, the generation identifier is configured as an advanced configuration and power interface (ACPI) table in a BIOS image. A driver can be used to read the value of the generation identifier from the ACPI table and provide the value to a service or application requesting the information.

As mentioned with respect to FIG. 1, a BIOS is part of the hardware of the physical machine (the BIOS may also be referred to as being part of the firmware of the physical machine because of the ability of BIOS to be updated). The BIOS contains a persistent image of the I/O (input/output) functionality to enable startup of a system. The persistent code image of a BIOS in a physical machine is mapped into the physical address space at a fixed location. A similar persistent code image can be present in a virtual machine.

In accordance with certain embodiments of the invention, one of the emulated components of the underlying physical machine in an execution container of a virtual machine is a BIOS device. When the virtualization layer prepares a container (e.g., partition) for execution, the virtualization layer maps the BIOS image into a fixed location in the container's physical address space (e.g., generates a reflection of the BIOS image). When the virtualization layer generates the reflection of the BIOS image in a virtual machine, the virtualization layer can modify the BIOS image before execution begins. According to one embodiment, a virtualization layer is provided that populates the BIOS image with the generation identifier prior to all execution within the container.

In a specific embodiment, the emulated BIOS device is responsible for projecting the generation identifier into the virtual machine. The BIOS device calculates the physical address of the generation identifier ACPI table in the BIOS image during the boot sequence. When the address of the table is made known to the emulated BIOS device, the emulated BIOS device retrieves the generation identifier from the configuration context and writes the identifier into the specified address space of the virtual machine. The emulated BIOS device caches the table address so that the table address is persisted upon save and repopulated upon restore.

According to certain embodiments of the invention, a new generation identifier is assigned to each new configuration context upon creation. However, embodiments of the invention are not limited to generating a new generation identifier upon the configuration context creation step. For example, the system may be configured such that other processes, calls, or actions result in an issuance and association of a new generation identifier. For example, a new identifier may be generated at a point after a snapshot is created after determining that a snapshot exists in the system. Unlike a chassis-ID that is a unique identifier associated with a virtual machine, but stays the same for every snapshot, embodiments of the invention provide a generation identifier that changes depending on whether a discontiguous event occurs.

Figure 4:
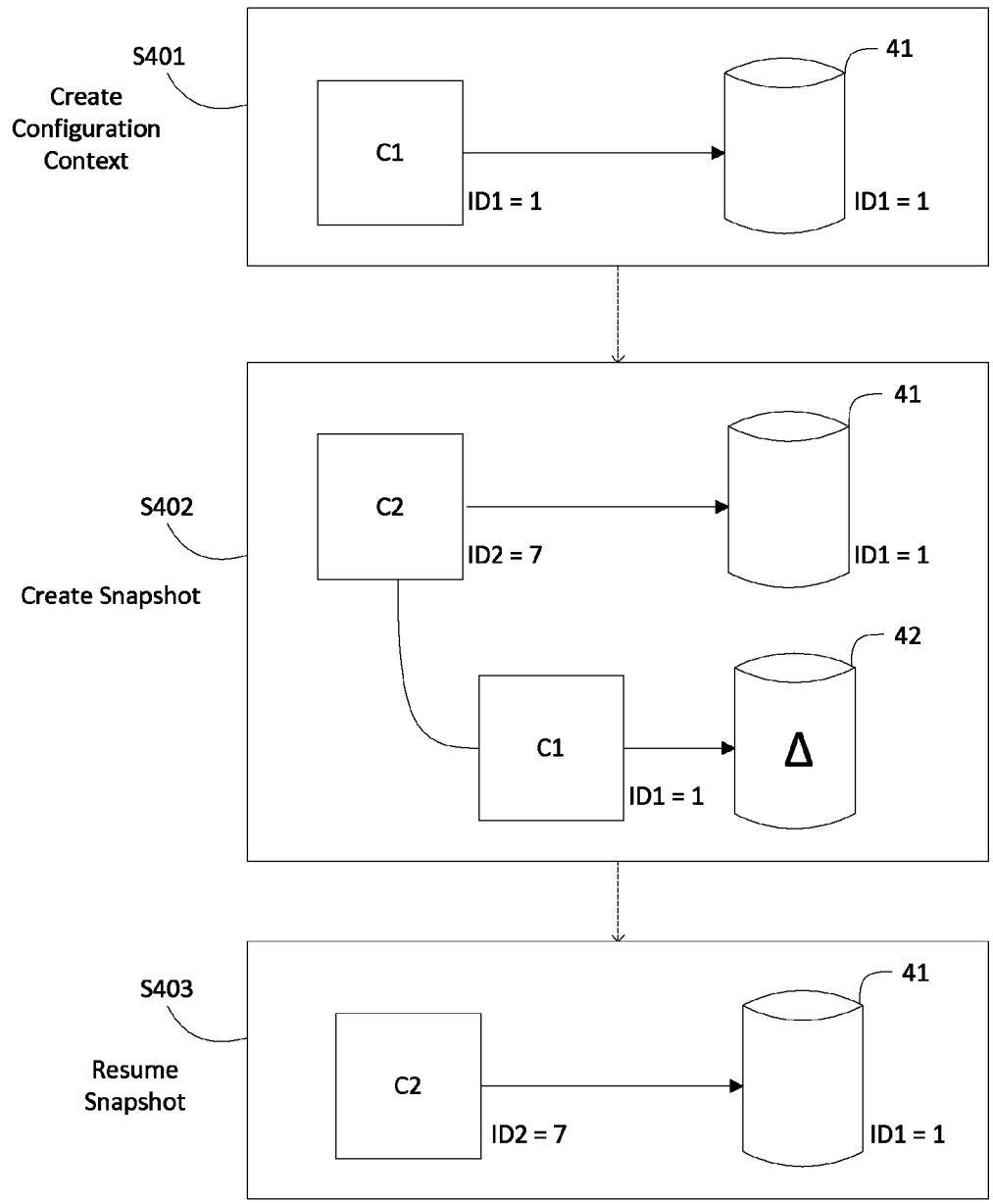
FIG. 4 illustrates a virtual machine configuration context creation, snapshot, and replay sequence that may occur in a virtual machine environment.

FIG. 4 illustrates a virtual machine configuration context creation S401, snapshot S402, and replay S403 sequence that may occur in a virtual machine environment in which the subject generation identifier may be used. Referring to FIG. 4, a virtual machine can be created (S401) with an initial configuration context C1 including a virtual hard disk 41 in which a generation identifier ID1 for the initial configuration context C1 or a pointer to the generation identifier ID1 is stored. As often occurs in practice, a snapshot (S402) of the virtual machine can be taken. In accordance with an embodiment of the invention, a configuration context C2 is created, generating a new generation identifier ID2 associated with the configuration context C2.

The generated value for the generation identifiers can be randomly generated according to any suitable random number generation method. In certain embodiments, the random number generation method is arranged to avoid repeating values for the subject identifiers for a reasonable number of newly created configuration contexts or snapshots.

The configuration context C2 created by the snapshot points to the virtual hard disk 41, which contains the data for the initial configuration context C1 at the time the snapshot is taken. A differencing disk 42 is created in which processes continuing in the initial configuration context C1 can write data to. The differencing disk 42 is linked to the virtual hard disk as a child to parent, and stores all the changes that would otherwise be made in the virtual hard disk 41. Here, no identifier is added to the differencing disk 42 because the differencing disk 42 looks to its parent for its identifier. However, embodiments are not limited thereto.

If the snapshot is resumed (as in a replay step S403), the differencing disk 42 and the initial configuration context C1 are removed. Because the snapshot's generation identifier ID2 does not match the identifier ID1 stored in the virtual hard disk 41, it is possible for applications and/or services running on the virtual machine to easily determine that the configuration context C2 is not the most recent. For the illustration of FIG. 4, a generation identifier value of 1 is given for ID1 and a generation identifier value of 7 is given for ID2. It should be understood that these values are merely for illustration and that values associated with the identifier may be a string of binary or hexadecimal digits or some other suitable value format.

By comparing generation identifiers, services running in a virtual machine can determine whether a time interval in their execution timeline has been or is in the process of being repeated. In accordance with certain embodiments of the invention, services inside the virtual machine execution environment can sample the generation identifier to assess whether the current execution sequence is the most recent and is not a potentially repeated time interval due to time-shifting.

In one embodiment, services can sample the generation identifier while resuming execution and store the identifier inside their persistent dataset. As long as services continue to observe the same generation identifier across all discontinuities in their execution timeline, they can safely operate under the assumption that no other generation of the current configuration context has executed against the dataset.

Figure 5:
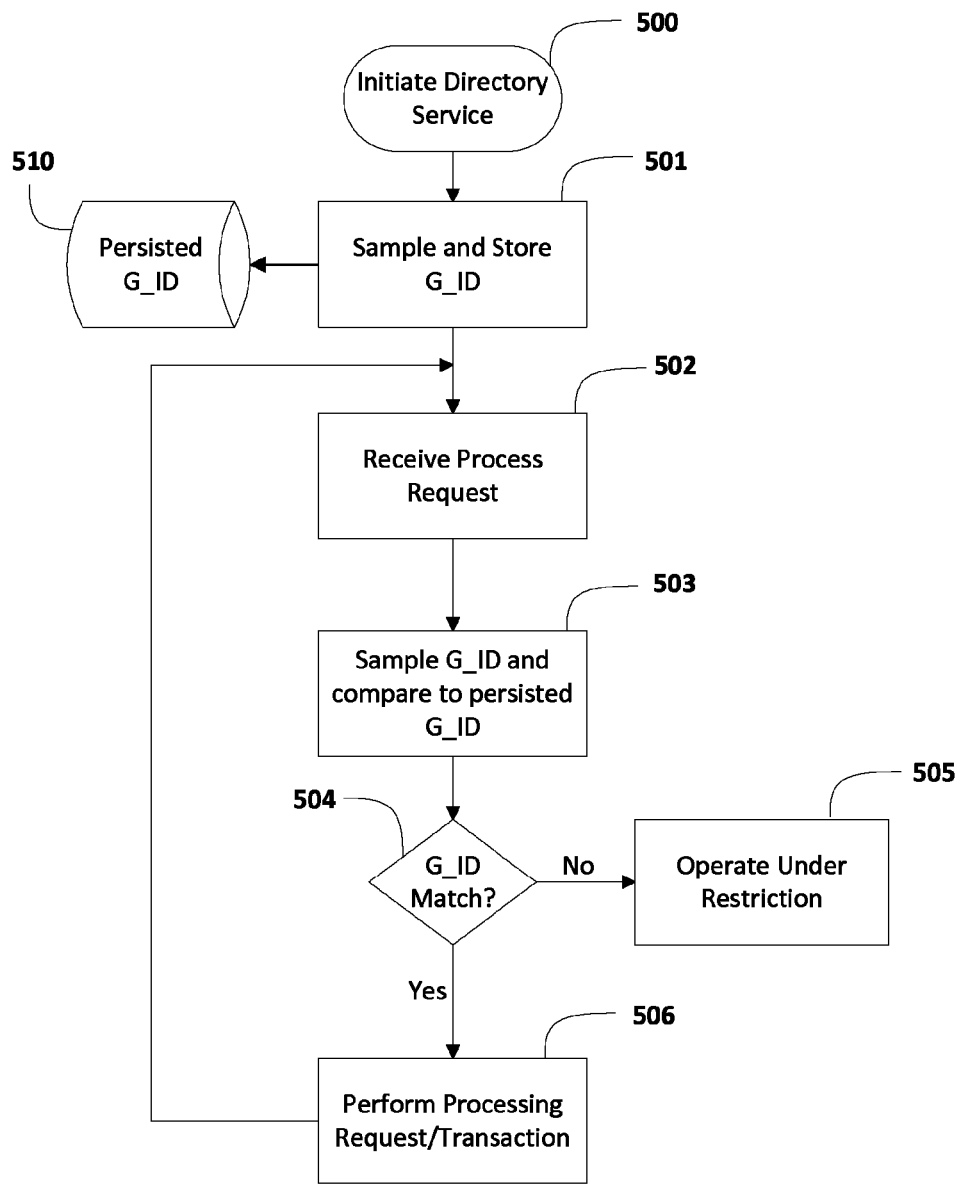
FIG. 5 shows a process flow of a directory service utilizing a generation identifier in accordance with an embodiment of the invention.

FIG. 5 shows a process flow of a directory service utilizing a generation identifier in accordance with an embodiment of the invention. The directory service can be, for example, Active Directory®, a registered trademark of Microsoft Corporation. Referring to FIG. 5, upon initiation of a directory service 500, the generation identifier G_ID associated with the configuration context of the virtual machine on which the directory service is running is sampled and stored as indicated in block 501 in the attached storage resource 510 of the directory service as the persisted G_ID. The attached storage resource 510 can be any suitable computer readable medium and, in certain embodiments, may be distributed across multiple media. In one embodiment, the attached storage resource 510 includes a hard drive.

Arbitrary processing requests, including peer-to-peer (and client-server) synchronization processes, may begin as indicated in block 502. Before processing a request or committing to transactions, the directory service samples the generation identifier G_ID associated with the virtual machine on which the directory service is running in order to assess whether the current execution sequence is the most recent and is not a potentially repeated time interval due to time-shifting. This step can be performed by sampling the generation identifier G_ID and comparing this value with the persisted G_ID as indicated in block 503.

For example, the directory service can perform a get generation identifier operation which returns the value of G_ID associated with the configuration context on which the directory service is running. This value can then be compared to the value stored as part of the directory service's persistent dataset on an attached storage resource. In one embodiment where the generation identifier is configured as an ACPI table in an emulated BIOS device, the get generation identifier operation returns the G_ID value from the ACPI table in the emulated BIOS device of the virtual machine configuration context on which the directory service is running.

In accordance with certain embodiments, the determination 504 of whether the generation identifier G_ID matches the persisted G_ID may be performed before performing a particular process request and/or committing a transaction. If the sampled generation identifier G_ID does not match the persisted G_ID, then the directory service performs under restricted operation as indicated in block 505. In certain embodiments, the restricted operation may involve, but is not limited to, blocking write operations, intercepting access requests, or preventing performance of a particular process or transaction. If the sampled generation identifier G_ID matches the persisted G_ID, then the process request or transaction can be performed as indicated in block 506. In another embodiment, the comparing of the sampled G_ID to the persisted G_ID (503) and the matching result determination (504) are performed atomically with performing the processing request/transaction (506).

It is possible to assess whether the current execution sequence is the most recent by performing the determination of whether the sampled generation identifier G_ID matches the persisted G_ID because if the processing requests are being executed from a snapshot, the sampling of the generation identifier G_ID will result in receiving a value that is different than the value of the persisted G_ID that was stored in the attached storage resource 510 during the initialization of the directory service.

Because performing an online snapshot of a machine state captured at an arbitrary instruction boundary requires time to perform certain actions including, but not limited to, freezing I/O requests, saving contents of memory, creation of a separate virtual machine that is populated with the snapshot, and resuming processes, it may take a period of time before the new generation identifier is established for the snapshot and accessible to a service. For cases where online snapshots are utilized, it can be beneficial to delay the resuming of processes and transactions (with their corresponding sampling and matching of generation identifiers) until at least the period of time passes. As one approach, processes can resume after a delay of at least one instruction cycle. An offline snapshot such as where the virtual machine is shut down and an orderly start-up is initiated, a time delay of the at least one cycle can be omitted.

In addition to services and applications subject to transparent time-shifting operations, applications and/or transactions incorporating random number generators can access the generation identifier.

Random number generators are used in applications where it is desirable to produce a random or unpredictable result. There are many applications for random number generators including, but not limited to, data encryption, simulations and models of complex phenomena, statistical sampling, games, and gambling. There are two general types of random number generators: a pseudo-random number generator and a true random number generator. A true random number generator tends to be associated with a physical phenomenon, such as flipping a coin or the points in time that a radioactive source decays. A pseudo-random number generator tends to involve computational or mathematical algorithms that generate a long string of numbers appearing to be unpredictable, but able to be completely determined by its initial value seed or key. A true random number generator may be used to seed a pseudorandom number generator.

A weakness in the pseudo-random number generator that may be exploited is that the sequence of numbers generated from a particular seed will eventually repeat. This results in the sequence being predictable, leaving vulnerabilities in a cryptography (encryption) system. To mitigate the vulnerabilities, frequent regeneration of random numbers is often conducted.

Virtual machine environments can create additional security vulnerabilities during time-shifting operations. For example, rolling back or replaying a previous machine state can re-expose security-patched vulnerabilities, reactivate vulnerable services, re-enable previously disabled accounts or passwords, use previously retired encryption keys, and change firewalls to expose vulnerabilities. It can also reintroduce worms, viruses, and other malicious code that had previously been removed, as well as enabling an attacker to simply replay previously sniffed passwords.

Another problem for virtual machine environments arises in protocols that rely on the "freshness" of their random number source, such as protocols for generating session keys or nonces. If a process in a virtual machine is replayed from a point after a random number has been chosen, but before it has been used, the random number is no longer "fresh" because it has already been used. A stream cipher is an example of a protocol that relies on the freshness of its random number source. In stream ciphering, a plaintext message is encrypted one character (or digit) at a time by using a unique keystream. To keep the message secure, a fresh session key or nonce is supplied to provide the unique keystream for each invocation of the cipher. For a stream cipher where the random number is no longer "fresh," two different plaintext messages could be encrypted under the same keystream. This can expose the XOR of the two messages, which, in turn, can expose the two messages. Similarly, Zero Knowledge Proof of Knowledge (ZKPK) authentication protocols and signature systems derived from ZKPK protocols are also vulnerable to exposing a user's identity or password if the same random nonces are used multiple times.

In accordance with certain embodiments of the invention, the subject generation identifier is used to instigate a refreshing of the seed of a random number generator.

In one embodiment, a random number generator being executed on a virtual machine samples a generation identifier of the virtual machine's current configuration context and refreshes its seed upon determining that the value of the generation identifier does not match a persisted generation identifier, the persisted generation identifier being the generation identifier sampled during an initialization or resumption of execution of the random number generator. For example, when the generation identifier changes, a security service can repopulate an entropy table of the system. An entropy table is a stream of pseudo-random data used to seed other random number and key generators. In one embodiment, the value of the generation identifier can be used as the seed for the generation of the entropy table.

Figure 6:
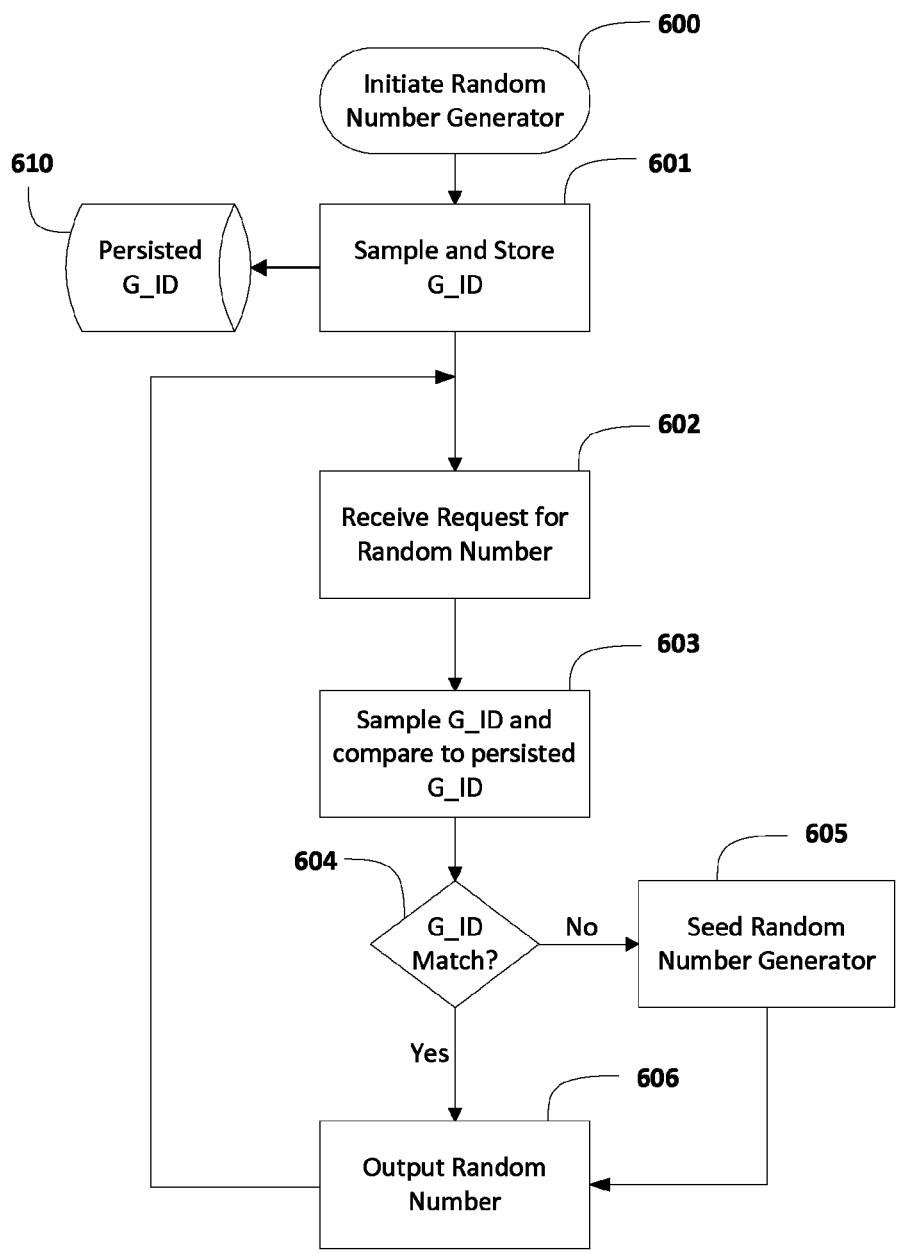
FIG. 6 shows a process flow of a random number generator utilizing a generation identifier in accordance with an embodiment of the invention.

FIG. 6 shows a process flow of a random number generator utilizing a generation identifier in accordance with an embodiment of the invention. Referring to FIG. 6, upon initiation of a random number generator 600, the generation identifier G_ID associated with the configuration context of the virtual machine on which the random number generator is running is sampled and stored as indicated in block 601 in an attached storage resource 610 as the persisted G_ID. The attached storage resource 610 can be any suitable computer readable medium and, in certain embodiments, may be distributed across multiple media. In one embodiment, the attached storage resource 610 includes a hard drive.

Certain processes run the random number generator in order to obtain a random number. In accordance with an embodiment of the invention, each time the random number generator receives a request to output a random number 602, the random number generator samples a generation identifier of the virtual machine on which the random number generator is running (a "local" generation identifier) and compares the generation identifier of the virtual machine configuration context of the virtual machine on which the random number generator is running to the persisted G_ID 603. The random number generator then determines whether to the two values (the local generation identifier and the persisted G_ID) match or do not match 604. If the two values match, then the random number generator outputs the random number to a process requesting a random number 606. If the two values do not match, the seed of the random number generator is refreshed 605 before outputting the random number (606) to a process requesting a random number. In another embodiment, the steps 603, 604, 605, and 606 are performed atomically.

Certain techniques set forth herein may be described in the general context of computer-executable instructions, such as program modules, executed by one or more computers or other devices. Certain embodiments of the invention contemplate the use of a computer system or virtual machine within which a set of instructions, when executed, can cause the system to perform any one or more of the methodologies discussed above. Generally, program modules include routines, programs, objects, components, and data structures that perform particular tasks or implement particular abstract data types.

For a virtual machine computing environment, the physical platform on which the virtual machine is hosted can be embodied as a personal computer, a server computer, a handheld or laptop device, a multiprocessor system, a microprocessor-based system, programmable consumer electronics, and a distributed computing environment that includes any of the above systems or devices.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media capable of storing computer-readable media now known or later developed. Computer-readable media should not be construed or interpreted to include any propagating signals.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated within the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of operating a computer system comprising a physical hardware platform, the method comprising:
   determining whether an execution timeline interval of a service or application executing on a virtual machine hosted on the physical hardware platform has been or is in a process of being repeated, the determining comprising:
   sampling a generation identifier associated with a virtual machine configuration context on which the execution timeline interval of the service or application is being performed, the generation identifier having a value established upon generating the virtual machine configuration context and configured to be sampled by the service or application running on the virtual machine in order to indicate whether a current generation of the virtual machine configuration context is a latest generation; and
   comparing the generation identifier to a persisted generation identifier stored in a computer-readable medium providing a storage resource associated with the service or application, the persisted generation identifier being the generation identifier sampled during an initialization or resumption of execution of the service or application,
   wherein comparing the generation identifier yields a result, the result being either matching or non-matching,
   wherein the non-matching result provides a determination that the execution timeline interval has been or is in the process of being repeated.

2. The method of claim 1, further comprising:
   receiving a process request for the service or the application;
   when the determination is that the execution timeline interval has been or is in the process of being repeated, then operating the service or the application under restriction; and
   when the result of the comparing is the matching result, then performing the processing request or a transaction.

3. The method of claim 1, wherein the generation identifier is configured as an advanced configuration and power interface (ACPI) table in a BIOS image.

4. The method of claim 3, wherein sampling the generation identifier comprises obtaining the value of the generation identifier from the ACPI table in the BIOS image.

5. The method of claim 1, wherein the value of the generation identifier is a random number.

6. The method of claim 1, wherein the value of the generation identifier remains constant for an execution timeline having one or more contiguous and non-repeating time intervals,
   the value of the generation identifier changing when the execution timeline contains a discontiguous time interval such that a sampling of the generation identifier for a particular virtual machine configuration context and a comparing of the generation identifier for the particular virtual machine configuration context to the persisted generation identifier by the service or application running on a virtual machine having the particular virtual machine configuration context indicates whether the current generation is the latest generation.

7. The method of claim 1, wherein the service or application comprises a random number generator, the method further comprising:
  initializing the random number generator by obtaining a seed; sampling the generation identifier of the virtual machine on which the random number generator is being executed; and storing the value of the generation identifier as the persisted generation identifier, wherein the value of the generation identifier remains constant for an execution timeline having one or more contiguous and non-repeating time intervals, and the value of the generation identifier changes when the execution timeline contains a discontiguous time interval;
  receiving a request to generate a random number;
  when the result of the comparing is the matching result, then generating the random number; and
  when the determination is that the execution timeline interval has been or is in the process of being repeated, then refreshing the seed of the random number generator and generating the random number after the refreshing of the seed of the random number generator.

8. A computer system comprising:
  a computer-readable medium having computer-readable instructions stored thereon implementing a virtual machine including generating a virtual machine configuration context;
  a computer-readable medium having computer-readable instructions stored thereon implementing a service or application executing on the implemented virtual machine;
  a computer-readable medium providing a storage resource associated with the service or application; and
  at least one physical processor for executing the computer-readable instructions implementing the virtual machine and the computer-readable instructions implementing the service or application to perform a method comprising:
  determining whether an execution timeline interval of the service or application executing on the implemented virtual machine has been or is in a process of being repeated, the determining comprising:
  sampling a generation identifier associated with a virtual machine configuration context on which an execution timeline interval of the service or application is being executed, the generation identifier having a value established upon generating the virtual machine configuration context and configured to be sampled by the service or application running on the virtual machine in order to indicate whether a current generation of the virtual machine configuration context is a latest generation; and
  comparing the generation identifier to a persisted generation identifier stored in the computer-readable medium providing the storage resource associated with the service or application, the persisted generation identifier being the generation identifier sampled during an initialization or resumption of execution of the service or application,
  wherein comparing the generation identifier yields a result, the result being either matching or non-matching,
  wherein the non-matching result provides a determination that the execution timeline interval has been or is in the process of being repeated.

9. The computer system of claim 8, wherein the value of the generation identifier remains constant for an execution timeline having one or more contiguous and non-repeating time intervals, the value of the generation identifier changing when the execution timeline contains a discontiguous time interval such that a sampling of the generation identifier for a particular virtual machine configuration context and a comparing of the generation identifier for the particular virtual machine configuration context to the persisted generation identifier by the service or application executing on the virtual machine having the particular virtual machine configuration context indicates whether the current generation is the latest generation;
  wherein:
    the determining is performed upon receiving a process request for the service or the application;
    when the determination is that the execution timeline interval has been or is in the process of being repeated, then the service or the application is operated under restriction; and
    when the result of the comparing is the matching result, then the processing request or a transaction is executed.

10. The computer system of claim 8, wherein the generation identifier is configured as an advanced configuration and power interface (ACPI) table in a BIOS image.

11. The computer system of claim 10, wherein sampling the generation identifier comprises obtaining the value of the generation identifier from the ACPI table in the BIOS image.

12. The computer system of claim 8, wherein the value of the generation identifier is a random number.

13. The computer system of claim 8, wherein the service or application comprises a random number generator, the computer-readable medium having computer-readable instructions implementing the service or application comprising instructions for performing a method comprising:
  initializing the random number generator by obtaining a seed; sampling the generation identifier of the virtual machine on which the random number generator is being executed; and
  storing the value of the generation identifier as the persisted generation identifier, wherein the value of the generation identifier remains constant for an execution timeline having one or more contiguous and non-repeating time intervals, and the value of the generation identifier changes when the execution timeline contains a discontiguous time interval;
  receiving a request to generate a random number;
  when the result of the comparing is the matching result, then generating the random number; and
  when the determination is that the execution timeline interval has been or is in the process of being repeated, then refreshing the seed of the random number generator and generating the random number after the refreshing of the seed of the random number generator.

\* \* \* \* \*